US007609394B2

United States Patent
Hosoi (10) Patent No.: US 7,609,394 B2
(45) Date of Patent: Oct. 27, 2009

(54) PRINTING CONTROLLING METHOD AND PRINTING CONTROL PROGRAM THEREOF

(75) Inventor: Tetsuya Hosoi, Tokyo (JP)

(73) Assignee: Oki Data Corporation, Tokyo (JP)

(*) Notice: Subject to any disclaimer, the term of this patent is extended or adjusted under 35 U.S.C. 154(b) by 890 days.

(21) Appl. No.: 10/987,097

(22) Filed: Nov. 12, 2004

(65) Prior Publication Data
US 2005/0105123 A1 May 19, 2005

(30) Foreign Application Priority Data
Nov. 13, 2003 (JP) ............... 2003-383333

(51) Int. Cl.
G06F 15/00 (2006.01)
G06K 1/00 (2006.01)

(52) U.S. Cl. .............. 358/1.1; 358/1.9; 358/1.15; 358/1.18

(58) Field of Classification Search ............ 358/1.2, 358/1.13–1.18, 1.9; 709/219
See application file for complete search history.

(56) References Cited

U.S. PATENT DOCUMENTS

| 6,078,404 | A | * | 6/2000 | Natsume et al. ............ 358/1.2 |
| 7,251,046 | B2 | * | 7/2007 | Mochizuki et al. ......... 358/1.13 |
| 7,284,040 | B2 | * | 10/2007 | Kobayashi et al. ........... 709/219 |
| 7,411,690 | B2 | * | 8/2008 | Tsukada ..................... 358/1.15 |
| 7,440,134 | B2 | * | 10/2008 | Natori ......................... 358/1.9 |
| 7,453,595 | B2 | * | 11/2008 | Natori ........................ 358/1.18 |

FOREIGN PATENT DOCUMENTS

| JP | 2001-005620 A | 1/2001 |
| JP | 2001-075950 A | 3/2001 |
| JP | 2001-100968 A | 4/2001 |
| JP | 2002-312137 A | 10/2002 |

* cited by examiner

*Primary Examiner*—Edward L Coles
*Assistant Examiner*—Satwant K Singh
(74) *Attorney, Agent, or Firm*—Panitch Schwarze Belisario & Nadel LLP (57) ABSTRACT

With a printing controlling method, to reduce time for image output even where a text confirmation time is required for a preview, text created by an operator is converted into printing data in parallel with a preview and added with a storage command to be transmitted to an image forming apparatus, and the data are stored in a received data storage buffer to be on standby with waiting for a subsequent command. Where reedition is needed through the preview, an erase command is transmitted from an image processing apparatus to cancel the printing data stored in the received data storage buffer. Conversely where reedition is not necessary, a printing start command is transmitted from the image processing apparatus to execute analysis of the printing data stored in the received data storage buffer, thereby stepping forward to a procedure for printing execution.

21 Claims, 8 Drawing Sheets

Block Diagram Showing A Structure According To The First Embodiment

Fig.1

Block Diagram Showing A Structure According To The First Embodiment

Fig.2

Illustration Showing Property For Selecting Application
For Production Timing For Printing Data

Fig. 3

Flow Chart 1 Showing Operation According To The First Embodiment

Fig.4

Flow Chart 2 Showing Operation According To The First Embodimanet

Fig.5

Block Diagram Showing A Structure According To The Second Embodiment

Fig.6

Illustration Showing Property For Selecting Application
For A Storage State Of Printing Data Folow Chart 1 Showing Operation According To The Second Embodiment

Fig.8

Flow Chart 2 Showing Operation According To The Scond Embodiment

PRINTING CONTROLLING METHOD AND PRINTING CONTROL PROGRAM THEREOF

BACKGROUND OF THE INVENTION

1. Field of the Invention

This invention relates to a printing controlling method for controlling an image processing apparatus, e.g., a PC (Personal Computer) and an image forming apparatus, e.g., a printer apparatus, and to information recording media for storing a control program of the printing controlling method.

2. Description of Related Art

A printer driver incorporated in an image processing apparatus converts texts generated with the image processing apparatus, e.g., a PC into printing data. The printing data are transmitted to an image forming apparatus through a line, e.g., a LAN (Local Area Network) or the like. The printing data transmitted to the image forming apparatus are edited and developed to be outputted as printed images.

Texts generated with the image processing apparatus are ordinarily previewed before converted into the printing data on a display by an application software incorporated in the image processing apparatus, and converted into the printing data after confirmation of a printed form thereof, thereby being transmitted to a printing apparatus. With this conventional art, the contents of the generated texts are converted into the printing data after confirmed with the preview and transmitted to the printing apparatus. Therefore, problems remain unsolved in which text confirming time required for the preview leads to some delay in printing processing time.

As a measure for solving the aforementioned problem, for example, Japanese Patent Application Publication No. JA-2000-141822 (abstract) discloses a printer driver directing the image forming apparatus to operate preparation for record upon starting the conversion process. The preparation for the record is therefore completed when the image forming apparatus receives the printing data. The total printing time is thus shortened. No measure, however, is taken for the delay in the printing processing time caused by the text confirming time required for the preview.

SUMMARY OF THE INVENTION

A problem to be solved is that operation for preparing printing on a side of an image processing apparatus, such as, e.g., text confirmation time required for a preview, directly leads to delay in time between text generation and an image output.

According to the present invention, the text (hereinafter defined as a concept including images) created by an operator is converted, in parallel with a preview, into printing data, thereby being added with a save command to be transmitted to an image forming apparatus. The printing data are stored in a received data storage buffer disposed within the image forming apparatus, thereby being on standby with waiting for a subsequent command. Where reediting is necessary according to the preview, the image processing apparatus transmits an erase command. The image forming apparatus cancels the printing data stored in the received data storage buffer after receiving the erase command. On the other hand, where reediting is not necessary, the image processing apparatus transmits a printing start command. After receiving the printing start command, the image forming apparatus executes a command analysis of the printing data stored in to the received data storage buffer, thereby stepping forward to a procedure for a printing execution.

It can be aimed to shorten the time between the text generation and the image output by generating the printing data in parallel during the preview to output the printing data to the image forming apparatus before the printing starts. With the printer apparatus shared by a plurality of users, or with such as, e.g., the printer apparatus (the image forming apparatus) connected to a network, the time during the preview can be effectively utilized, so that load centralization can be advantageously lightened.

DETAILED DESCRIPTION OF THE PREFERRED EMBODIMENTS

Based on a computer readable program, a controller formed inside the image processing apparatus is able to execute: [1] a printing data production procedure in parallel with a preview; [2] an addition and output procedure for a printing standby command; [3] a reediting request procedure; and [4] a printing start request procedure, and a controller formed inside the image forming apparatus is able to execute [5] a printing data storage procedure; [6] a printing data canceling procedure; [7] a printing execution procedure, while those apparatuses can be structured without increasing components. Hereinafter, the above is described in detail.

The First Embodiment

Figure 1:
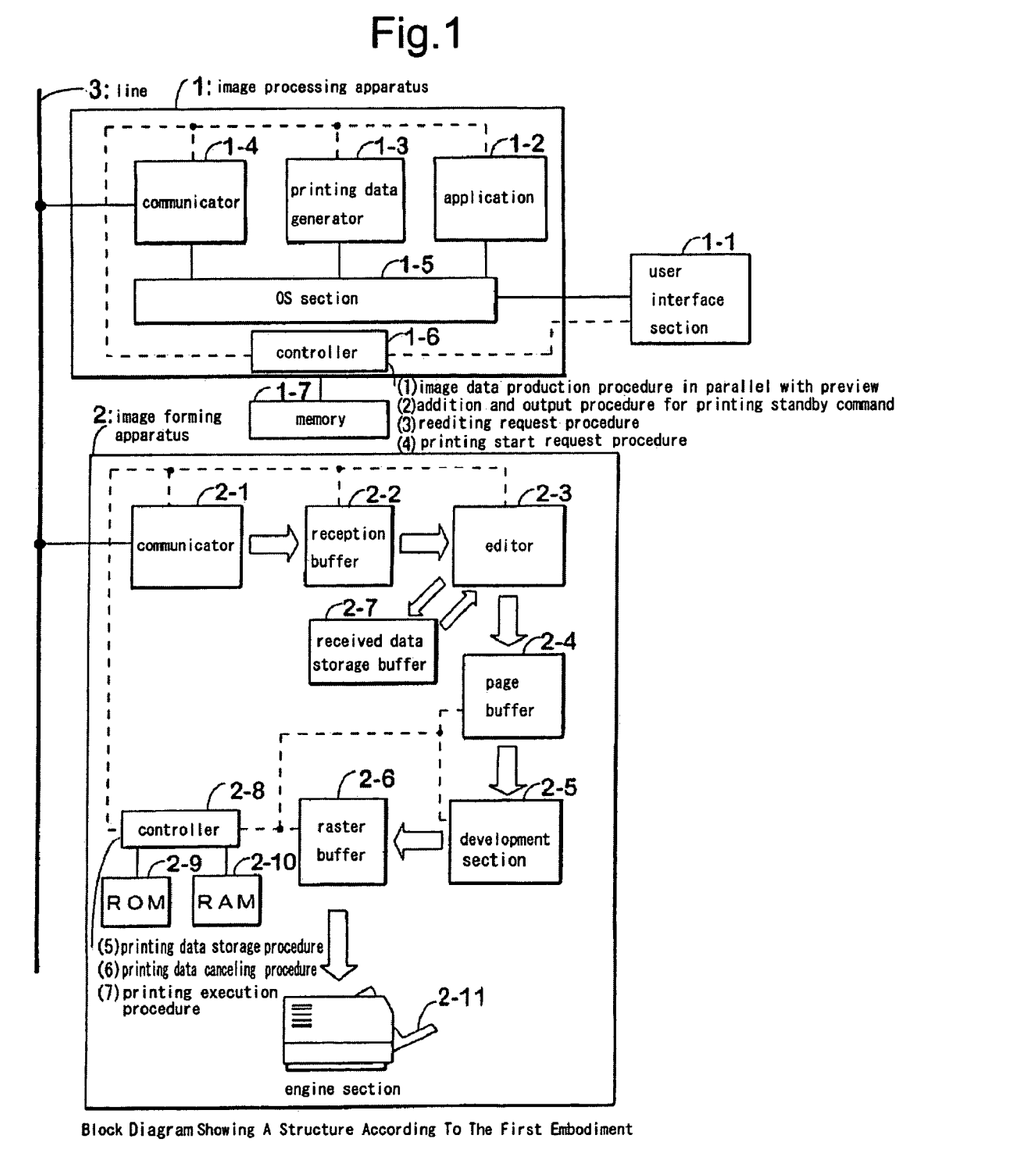
FIG. 1 is a block diagram showing a structure according to the first embodiment.

FIG. 1 is a block diagram showing a structure according to the first embodiment. As shown in FIG. 1, a method for controlling printing according to the first embodiment is executed in using an image processing apparatus 1, an image forming apparatus 2, and a line 3.

The image processing apparatus 1 serving as a host apparatus, such as, e.g., a PC (Personal Computer) generates a text while producing and transmitting a job based on the text to the image forming apparatus and includes a user interface 1-1, an application 1-2, a printing data generator 1-3, a communicator 1-4, an OS section 1-5, a controller 1-6, and a memory 1-7.

The user interface 1-1 is a section, such as, e.g., a key board, and a mouse, serving as an interface between an operator and the image processing apparatus. The application 1-2 is a section where the operator creates the text using the interface 1-1. The printing data generator 1-3 is a section for generating the printing data based on the text inputted by the operator and for adding necessary commands thereto to produce the job. Furthermore, the printing data generator 1-3 is a section for selecting timing for generating the printing data. Selection of the timing will be described next.

Figure 2:
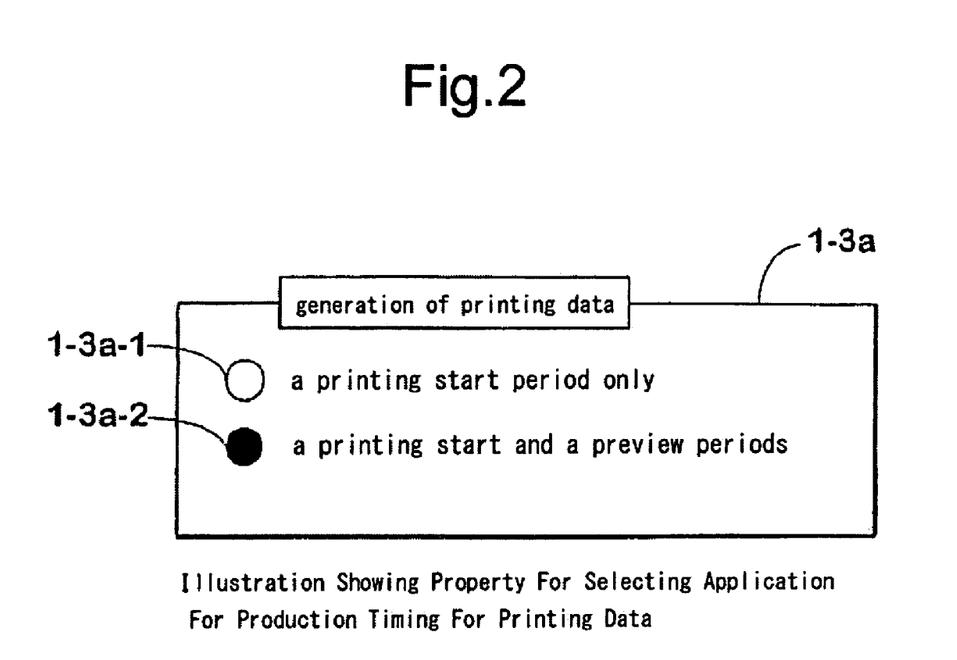
FIG. 2 is an illustration showing property for a selecting application for production timing for printing data.

FIG. 2 is an illustration showing property for selecting application for production timing for printing data. FIG. 2 is one example of the property of the printing data generator 1-3. A display unit, not shown in FIG. 2, arranged inside the image processing apparatus 1 displays this property 1-3a according to the application 1-2. The property 1-3a displays two options, a white circle: a printing start period only 1-3a-1, and a black circle: a printing start and the preview periods 1-3a-2. Where the operator selects the white circle designating that the printing start period only 1-3a-1, a method for controlling the printing is executed in which the printing data are generated after the operator selects the starting of the printing after previewing, and where the operator selects the black circle designating that the printing start and the preview periods 1-3a-2, the printing controlling method according to this embodiment is executed. The operator may select the printing start period where the operator wants to prioritize during the preview a program execution other than the printing data generation procedure, or makes a decision that the image forming apparatus has no or only a small amount of memories for saving the printing data.

In returning to FIG. 1, the communicator 14 is a section serving as an interface between the image processing apparatus 1 and the line 3 for transmitting the job to the image forming apparatus 2 through the line 3 after reception of the job from the printing data generator 1-3. The OS 1-5 is an integration of basic programs for managing the user interface 1-1, the application 1-2, the printing data generator 1-3, and the communicator 1-4. The controller 1-6 is a CPU (Central Processing Unit) for controlling the entire system of the image processing apparatus 1, and, in this embodiment, is a section for executing the image data production procedure [1] in parallel with the preview, the addition and output procedure [2] for the printing standby command, the reediting request procedure [3], and the printing start request procedure [4].

The printing data production procedure [1] in parallel with the preview is a control procedure for producing, during the preview for a confirmation of a printed form of an edited image as well as during a setting of a printing condition, the printing data of the edited image. Herein, the "preview" means operator's action to confirm the printed form of the text created (edited) by the operator prior to the printing operation upon showing the form on a display, not shown, arranged in the printing processing apparatus 1. Furthermore, the term of "during the period for setting the printing condition" means operation for printing preparation for setting an outputted form of a printed image, such as, e.g., the setting of a margin or an insertion of page numbers.

The addition and output procedure [2] for the printing standby command is a control procedure for outputting the printing data upon adding the printing standby command to the printing data. The printing standby command is defined as a control procedure for storing the printing data in a received data storage buffer 2-7 disposed within the image forming apparatus 2 and for making standby the printing data until reception of a printing start command or an erase command. The reediting request procedure [3] is a control procedure for outputting the erase command for the printing data to be canceled, which are already produced and stored in the received data storage buffer 2-7 in a case where the operator recognizes the need of the re-edition by executing the preview of the edited image. This procedure is an output procedure of the erase command. The printing start request procedure [4] is a control procedure for outputting the printing start command for starting the printing operation of the printing data stored in the received data storage buffer 2-7 in a case where the operator does not recognize any necessity for re-edition by executing the preview of the edited image.

The memory 1-7 is a memory for storing temporarily computer control programs enabling the controller 1-6 to execute: the image data production procedure [1] in parallel with the preview, the addition and output procedure for the printing standby command [2], the reedit requirement procedure [3], and the printing start requirement procedure [4] and for storing temporarily data needed during execution of those computer programs.

The image forming apparatus 2 is a printing apparatus such as a printer for receiving the job from the image processing apparatus 1 to edit and develop the printing data contained in the job and to output the printing data as the printing image, and has a communicator 2-1, a reception buffer 2-2, an editor 2-3, a page buffer 2-4, a development section 2-5, a raster buffer 2-6, a received data storage buffer 2-7, a controller 2-8, a ROM 2-9, a RAM 2-10, and an engine section 2-11.

The communicator 2-1 is a section serving as an interface between the image forming apparatus 2 and the line 3 for receiving the job from the image forming apparatus 1 through the line 3. The reception buffer 2-2 is a buffer holding temporarily the job received from the image processing apparatus 1 through the line 3 as well as the communicator 2-1.

The editor 2-3 is a section for analyzing commands after retrieving the job stored temporarily in the reception buffer 2-2, converting the job into data of a unique format to the printer apparatus, and transmitting the job to the page buffer 2-4. Furthermore, the editor 2-3 is the section transmitting the received data of a single job as they are to the received data storage buffer 2-7 without executing any analysis of the command until receiving the printing start command or the erase command, in a case of retrieving the job in which the printing data are added with the printing standby command by the steps of the adding and output procedure [2] for the printing standby command.

The page buffer 2-4 is a memory for storing the printing data (hereinafter, referred to as a pattern of a page information format) received from the editor 2-3 and converted into the data format unique to the printing apparatus. The development section 2-5 is a section for retrieving the pattern of the page information type from the page buffer 2-4, converting the above pattern into the printing data converted into the raster pattern (hereinafter, referred to as a raster pattern) in a format to be actually printed on sheets, and transmitting the above raster pattern to the raster buffer 2-6. The raster buffer 2-6 is a memory for receiving the raster pattern from the development section 2-5 and storing the pattern.

The received data storage buffer 2-7 is a memory for storing the data of the single job received from the editor 2-3 as they are and waiting until reception of a subsequent command. The controller 2-8 is a CPU (Central Processing Unit) for controlling the entire system of the image forming apparatus 2, and, in this embodiment, is a section for executing the printing data storage procedure [5], the printing data canceling procedure [6], and the printing execution procedure [7].

The printing data storage procedure [5] is a control procedure storing the received data of the single job as they are in the received data storage buffer 2-7 and waiting until reception of a subsequent command, in a case where the image forming apparatus 2 receives from the image processing apparatus 1 the job made of the printed data added with the printing standby command by the steps of the addition and output command [2] for the printing standby command. This procedure is a printing data standby procedure.

The printing data canceling procedure [6] is a control procedure for canceling the job made of the printing data produced so far and stored in the received data storage buffer 2-7 when the operator executes the preview of the edited image and recognizes the need of the reedition.

The printing execution procedure [7] is a control procedure for accepting the printing start command transmitted when the operator does not recognize the need of the reedition even by executing the preview of the edited image and for executing the printing by performing subsequent processes corresponding to the printing data stored in the received data storage buffer 2-7.

The ROM 2-9 is a read only memory for storing the computer control program enabling the controller 2-8 to execute the printing data storage procedure [5], the printing data canceling procedure [6], and the printing execution procedure [7]. The RAM 2-10 is a random access memory for storing temporarily the data needed while the controller 2-8 executes the computer control program stored in the ROM 2-9. The engine section 2-11 is a section for retrieving the raster pattern stored in the raster buffer 2-6, thereby executing printing operation along with running of the sheets. The line 3 is a transmission line such as a LAN (Local Area Network) or Centronics for connecting the image processing apparatus 1 to the image forming apparatus 2.

Figure 3:
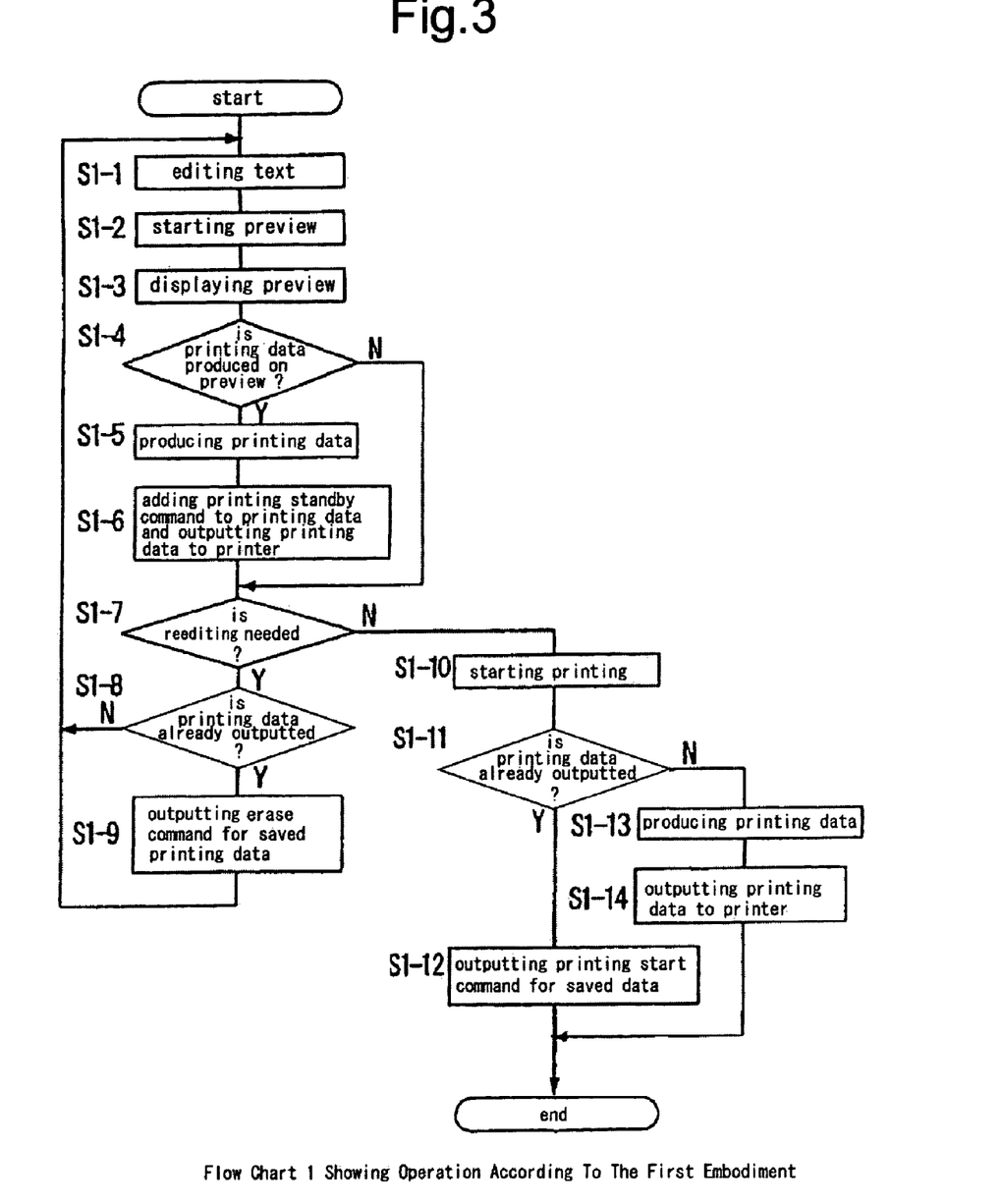
FIG. 3 is a flow chart 1 showing operation according to the first embodiment.

Operation according to the first embodiment is explained next. The operation according to the first embodiment is explained as divided into the operation of the image processing apparatus 1 (in FIG. 1) and the operation of the image forming apparatus 2 (in FIG. 1). FIG. 3 is a flow chart for illustrating the operation of the image processing apparatus 1 (in FIG. 1) according to the first embodiment in the order of the steps from the step S1-1 to the step S1-14.

At the step S1-1, the operator starts the application 1-2 (in FIG. 1) to create, or edit, the text using the user interface section 1-1 (in FIG. 1). The operator starts the preview to confirm at the step S1-2 that the text editing work done by himself is of the layout he supposed. At the step S1-3, the text created by the operator is shown on the display, not shown, disposed in the image processing apparatus 1 (in FIG. 1) prior to the printing.

At the step S14, the printing data generator 1-3 (in FIG. 1) makes a judgment as to whether any one of the white circle, the printing start period only 1-3a-1 and the black circle, the printing start and the preview periods 1-3a-2 is selected as the timing for producing the printing data, and where the white circle, the printing start period only 1-3a-1 is selected, the operation goes to the step S1-7 whereas where the black circle, the printing start and the preview periods 1-3a-2 is selected, the operation goes to the step S1-5. The printing data generator (in FIG. 1) starts generating the printing data at the step S1-5. This step corresponds to the image data production procedure in parallel with the preview.

At the step S1-6, the printing data generator 1-3 (in FIG. 1) adds the printing standby command to the generated printing data, thereby transmitting the printing data to the image forming apparatus 2 (in FIG. 1). This job is transmitted, independently to the subsequent flow, directly from this step to and is stored in the received data storage buffer 2-7 (in FIG. 1) through the communicator 14 (in FIG. 1), the line 3 (in FIG. 1), and the communicator 2-1 (in FIG. 1), thereby waiting until reception of a subsequent command or commands, which are explained in explanation for operation of the image forming apparatus as described below.

At the step S1-7, where the operator finds any defect in the text by means of the preview and recognizes the need of the reedition, the operation goes to the step S1-8. Furthermore, where the operator finds no defect in the text or does not recognize any need of reedition even where the text contains some small defects, the operation goes to the step S1-10. At the step S1-8, where the printing data are not yet transmitted toward the image forming apparatus 2 (in FIG. 1), the operation of the printing data generator 1-3 returns to the step S1-1 to redo the text editing. Where the printing data are already transmitted to the image forming apparatus 2 (in FIG. 1), however, the operation goes to the step S1-9.

At the step S1-9, the printing data generator 1-3 (in FIG. 1) transmits the job made of the erase command to the image forming apparatus 2 (in FIG. 1) in order to cancel the job (the printing data), which is already transmitted to the image forming apparatus 2 (in FIG. 1), is stored in the received data storage buffer 2-7 (in FIG. 1), and is waiting until reception of a subsequent command. The operation then returns to the step S1-1 to seek the operator to redo from the text reedition. This erase command is transmitted to the image forming apparatus 2 (in FIG. 1) through the communicator 1-4 (in FIG. 1), the line 3 (in FIG. 1), and the communicator 2-1 (in FIG. 1). The step 1-7 (a Y portion), the step S1-8, and the step S1-9 above described correspond to the reedit requirement procedure [3].

The application 1-2 (in FIG. 1) initiates the printing at the step S1-10. At the step S1-11, the operation of the printing data generator 1-3 (in FIG. 1) goes to the step S1-12 in a case where the printing data are already transmitted to the image forming apparatus 2, are stored in the received data storage buffer 2-7 (in FIG. 1), and are waiting until reception of the printing start command. Alternatively, the operation of the generator 1-3 goes to the step S1-13 in a case where the printing data are not yet transmitted to the image forming apparatus 2 (in FIG. 1).

The printing data generator 1-3 (in FIG. 1) outputs the printing start command for directing the image forming apparatus 2 (in FIG. 1) to execute printing at the step 1-12. The printing start command is transmitted to the image forming apparatus 2 (in FIG. 1) through the communicator 14 (in FIG. 1), the line 3 (in FIG. 1), and the communicator 2-1 (in FIG. 1). The printing data generator 1-3 (in FIG. 1) generates the printing data of an unconverted portion of the text at the step S1-13.

The printing data are transmitted to the image forming apparatus 2 (in FIG. 1) through the communicator 14 (in FIG. 1), the line 3 (in FIG. 1), and the communicator 2-1 (in FIG. 1) to perform normal printing at the step S1-14. Herein, the step S1-13 and the step S1-14 correspond to situations in which the white circle, the printing start period only 1-3a-1, is selected in the above described property 1-3a (in FIG. 2)

Figure 4:
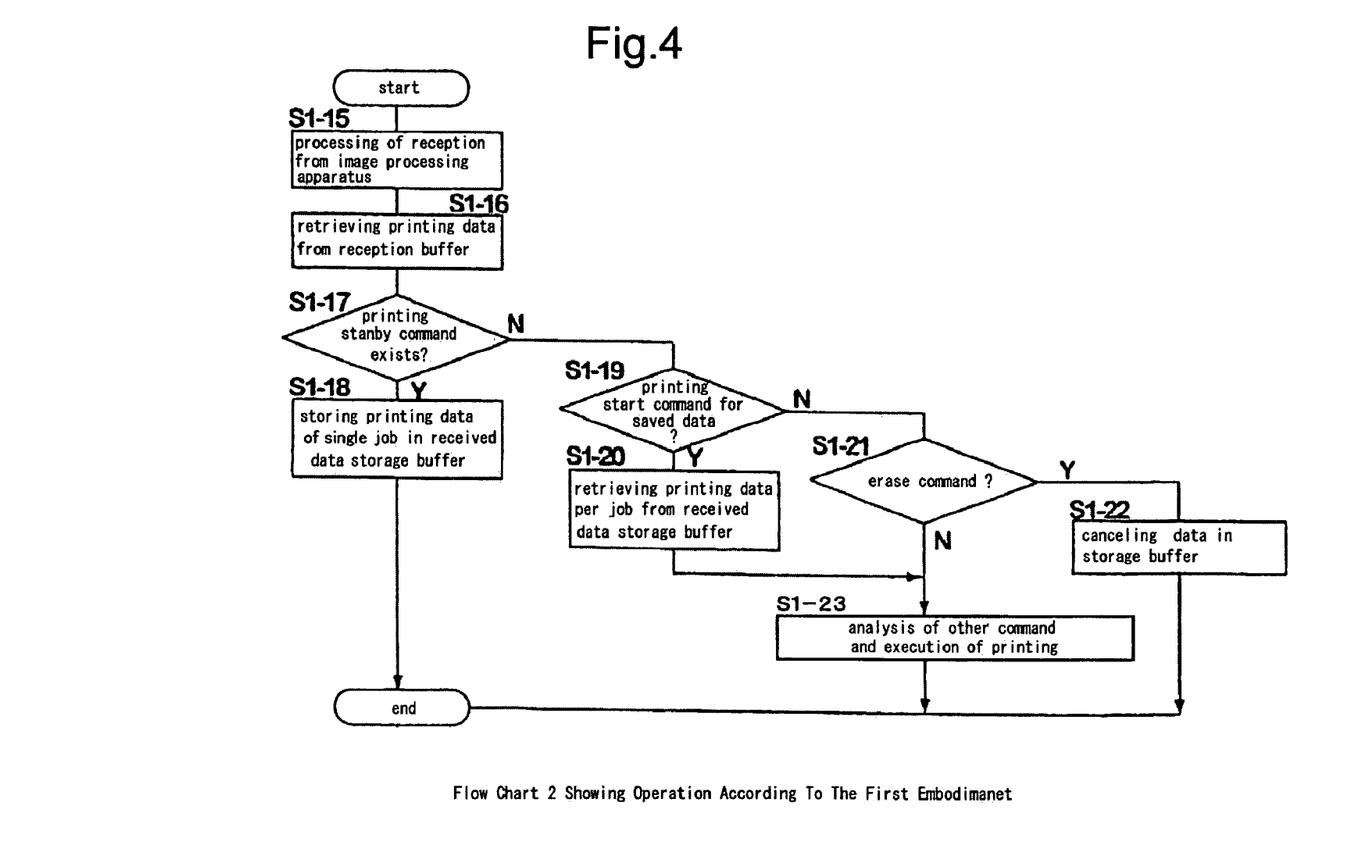
FIG. 4 is a flow chart 2 showing operation according to the first embodiment.

FIG. 4 is a flowchart for illustrating operation of the image forming apparatus 2 (in FIG. 1) according to the first embodiment in the order of the steps from the step S1-15 to the step S1-23.

At the step S1-15, the communicator 2-1 (in FIG. 1) receives the job including various commands, the printing data, and the like from the printing processing apparatus 1 (in FIG. 1) through the communicator 14 (in FIG. 1) and the line 3 (in FIG. 1), thereby holding temporarily the job in the reception buffer 2-2. The editor 2-3 (in FIG. 1) retrieves the job received from the image processing apparatus 1 (in FIG. 1) and held temporarily in the reception buffer 2-2 (in FIG. 1) at the step S1-16. At the step S1-17, the editor 2-3 (in FIG. 1) makes a judgment as to whether the job includes the printing data added with the printing standby command, and where the job includes the printing data added with the printing standby command, the operation goes to the step S1-18 whereas the job is other than that, the operation goes to the step S1-19.

The editor 2-3 (in FIG. 1) stores, at the step S1-18, the printing data of the single job as they are in the received data storage buffer 2-7 (in FIG. 1), and the operation of the editor 2-3 returns to the step S1-16 to retrieve the subsequent job. The step S1-17 (Y) and the step S1-18 described above correspond to the printing data storage procedure [5].

The editor 2-3 (in FIG. 1) makes a judgment at the step S1-19 as to whether the job is the printing start command, and if the job is the printing start command, the operation goes to the step S1-20 whereas if the job is not the printing start command, the operation goes to the step S1-21. At the step S1-20, the editor 2-3 (in FIG. 1) retrieves the printing data of the single job from the received data storage buffer 2-7 (in FIG. 1) and the operation goes to the step S1-23 described below to perform analysis of the other commands and the printing execution. The step S1-19 (Y), the step S1-20, and the step S1-23 described above correspond to the printing execution procedure [7].

The editor 2-3 makes a judgment at the step S1-21 as to whether the job is the erase command, and if the job is the erase command, the operation goes to the step S1-22 whereas if the job is not the erase command, which corresponds to a situation that the white circle, the printing start period only 1-3a-1, is selected, the operation goes to the step S1-23. At the step S1-22, the editor 2-3 (in FIG. 1) cancels the printing data of the single job stored in the received data storage buffer 2-7 (in FIG. 1), and the operation returns to the step S1-16. The step S1-21 (Y) and the step S1-22 described above correspond to the printing data canceling procedure [6]. The printing data retrieved or received at the step S1-22 are transmitted to the development section 2-5 (in FIG. 1) and the engine section 2-11 (in FIG. 1), so that the printing is executed at the step S1-23.

Each of the image data production procedure [1] in parallel with the preview, the addition and output procedure [2] for the printing standby command, the reediting request procedure [3], the printing start request procedure [4], the printing data storage procedure [5], the printing data canceling procedure [6], and the printing execution procedure [7] described the above is the control procedure based on the computer program stored in the computer readable recording media, but a part or the whole of those above procedures may consist of one or more specialized hardware capable of executing each procedure.

It is to be noted that in this embodiment, the printing data are added with the printing standby command after being produced in parallel with the preview, thereby being transmitted to the image forming apparatus, but the printing data may be transmitted after it is decided with the preview that no reedition is needed. In that situation, it is unnecessary to add the printing standby command.

As described above, with the invented method, the period from the text generation to image outputting can be shortened by producing the printing data in a parallel way during the preview or during the printing preparation operation and by outputting the data to the image forming apparatus before the printing start. With the invented method, the printers shared by plural users, such as printers, or image forming apparatuses, coupled to networks, are advantageous to lighten load concentrations to the printers or image forming apparatuses because of effectively utilizing the period during the preview.

The Second Embodiment

Figure 5:
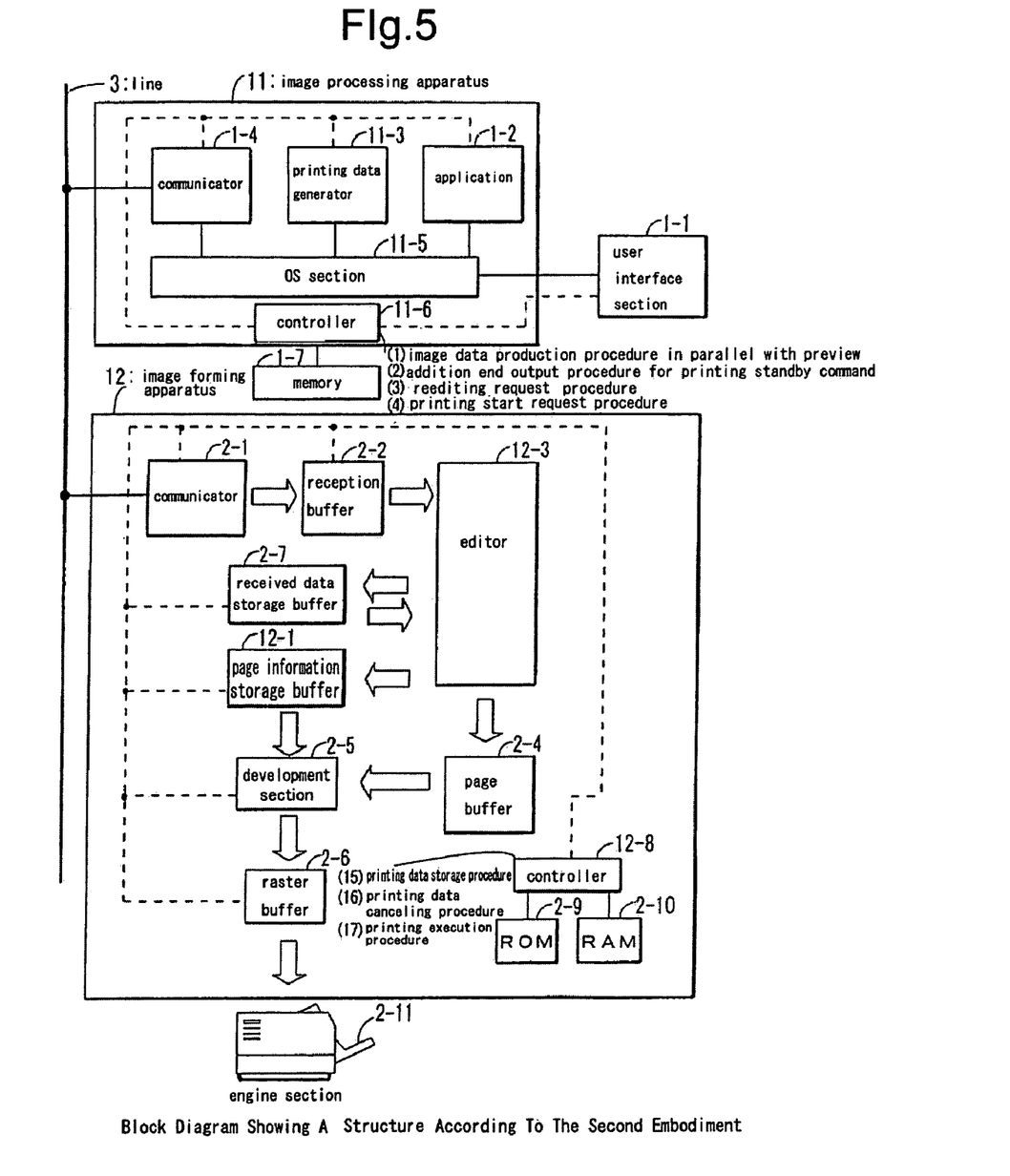
FIG. 5 is a block diagram showing a structure according to the second embodiment.

In this embodiment, in order to shorten the processing time compared with the controlling method according to the first embodiment, property for selecting a storage type of the printing data is further added in addition to the property for selecting the timing for generating the printing data as described in the first embodiment. By this means, the time between the text editing and the printing execution can be further shortened. This embodiment is structured as described the above. FIG. 5 is a block diagram showing a structure according to the second embodiment. As shown in FIG. 5, the printing controlling method according to the second embodiment is executed using an image processing apparatus 11, an image forming apparatus 12, and the line 3.

Hereinafter, only differences with the structure according to the first embodiment are described. In this embodiment, same numerals as in the first embodiment are assigned to the same elements of this embodiment as those in the first embodiment. The image processing apparatus 11 is a host apparatus, such as, e.g., a PC for generating a text and producing the printing data based on the text to transmit the printing data to the image forming apparatus 12, and includes the user interface 1-1, the application 1-2, a printing data generator 11-3, the communicator 1-4, an OS section 11-5, a controller 11-6, and the memory 1-7.

The printing data generator 11-3 is a section for generating the printing data based on the text inputted by the operator and for adding necessary commands to the printing data. Furthermore, the printing data generator 11-3 is a section for selecting a storage state for saving the printing data.

Figure 6:
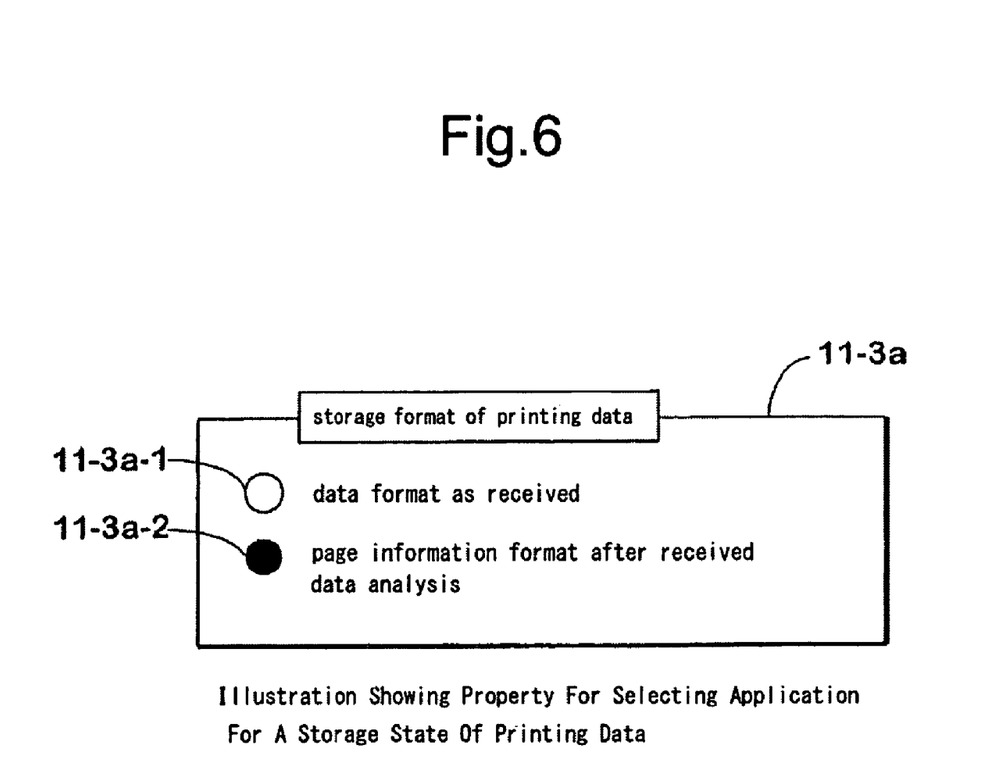
FIG. 6 is an illustration showing property for selecting application for a storage state of printing data.

FIG. 6 is an illustration showing property for selecting application for a storage state of printing data. FIG. 6 is one example of the property of the printing data generator 11-3. With the application 1-2, property 11-3a is indicated on the display, not shown, disposed within the image processing apparatus 11. The property 11-3a shows two options, a white circle, data format as received 11-3a-1, and a black circle, page information format after received data analysis 11-3a-2. Where the operator selects the white circle, the data format as received 11-3a-1, the printing controlling method according to the first embodiment is executed, and where the operator selects the black circle, the page information format after received data analysis 11-3a-2, the printing controlling method according to this embodiment is executed. The received data may have a less data amount but take time for a development process converting into the raster data when the image forming apparatus executes printing. The printing data in the page information format have a large data amount but operate as to shorten the time to printing because of the fast development process during printing. Therefore, where the image forming apparatus has a sufficient memory amount, the user selects the page information format as the printing data type to be outputted.

In returning to FIG. 5, the OS section 11-5 is an integration of basic programs for managing the user interface 1-1, the application 1-2, the printing data generator 11-3, and the communicator 1-4. The controller 11-6 is the CPU (Central Processing Unit) for controlling the entire system of the image processing apparatus 11, and, in this embodiment, is a section for executing the image data production procedure [1] in parallel with the preview, an addition and output procedure [12] for the printing standby command, the reediting request procedure [3], and the printing start request procedure [4].

The addition and output procedure [12] for the printing standby command is a control procedure for outputting the printing data after adding, in addition to the printing standby command, a standby type command for directing the standby type of the printing data, to the printing data. The standby type command is a command for directing the received data to be stored as received data format in the received data storage buffer 2-7, or to be converted into the page information format after the analysis of the received data and then stored in a page information storage buffer.

An image forming apparatus 12 is a printing apparatus, such as, e.g., a printer apparatus for receiving the printing data from the image processing apparatus 11, thereby editing and developing the printing data to output the data as the printed image, and has the communicator 2-1, the reception buffer 2-2, an editor 12-3, the page buffer 2-4, the development section 2-5, the raster buffer 2-6, the received data storage buffer 2-7, a page information storage buffer 12-1, a controller 12-8, the ROM 2-9, the RAM 2-10, and the engine section 2-11.

The page information storage buffer 12-1 is a memory for storing the received data of a single job, unique to the printer apparatus, received from the editor 12-3 and for waiting for reception of subsequent commands.

The editor 12-3 is a section for retrieving the job stored temporarily in the reception buffer 2-2 to analyze the command, thereby converting the job into the data format unique to the printer apparatus to transmit the data to the page buffer 2-4. Furthermore, where the addition and output procedure [12] for the printing standby command directs the editor 12-3 to save the data as received, the editor 12-3 transmits the received data of the single job as they are to the received data storage buffer 2-7. Where the addition and output procedure [12] for the printing standby command directs the editor 12-3 to save the received data as the page information format after the analysis of the received data, the editor 12-3 transmits the received data of the single job to the page information storage buffer 12-1 after receiving and converting the received data of the single job into the data format unique to the printer apparatus.

The controller 12-8 is the CPU (Central Processing Unit) for controlling the entire system of the image forming apparatus 12, and in this embodiment, a section for executing a printing data storage procedure [15], a printing data canceling procedure [16], and a printing execution procedure [17]. The printing data storage procedure [15] is a control procedure for storing, according to the direction by the command, the received data of the single job as they are in the received data storage buffer 2-7, or converting the received data of the single job into a data format unique to the printer to store the data format into the page information storage buffer 12-1, thereby waiting for reception of subsequent commands, where the image forming apparatus 12 receives, from the image processing apparatus 11, the job made of the printing data added with the printing standby command and the standby type command in association with the addition and output procedure [12] for the printing standby command. The printing data canceling procedure [16] is a control procedure for, at a time that the operator recognizes the need of the reedition by executing the preview of the edited image, canceling the job made of the printing data already produced and stored in the received data storage buffer 2-7 and canceling the page information stored in the page information storage buffer 12-1.

The printing execution procedure [17] is a procedure for receiving, when the operator does not recognize the need of the reedit by executing the preview, the printing start command outputted with [4] the printing start requirement procedure, thereby retrieving the printing data stored in the received data storage buffer 2-7 or in the page information storage buffer 12-1, thereby starting the printing upon making a subsequent predetermined process as being different from each of the standby types.

Figure 7:
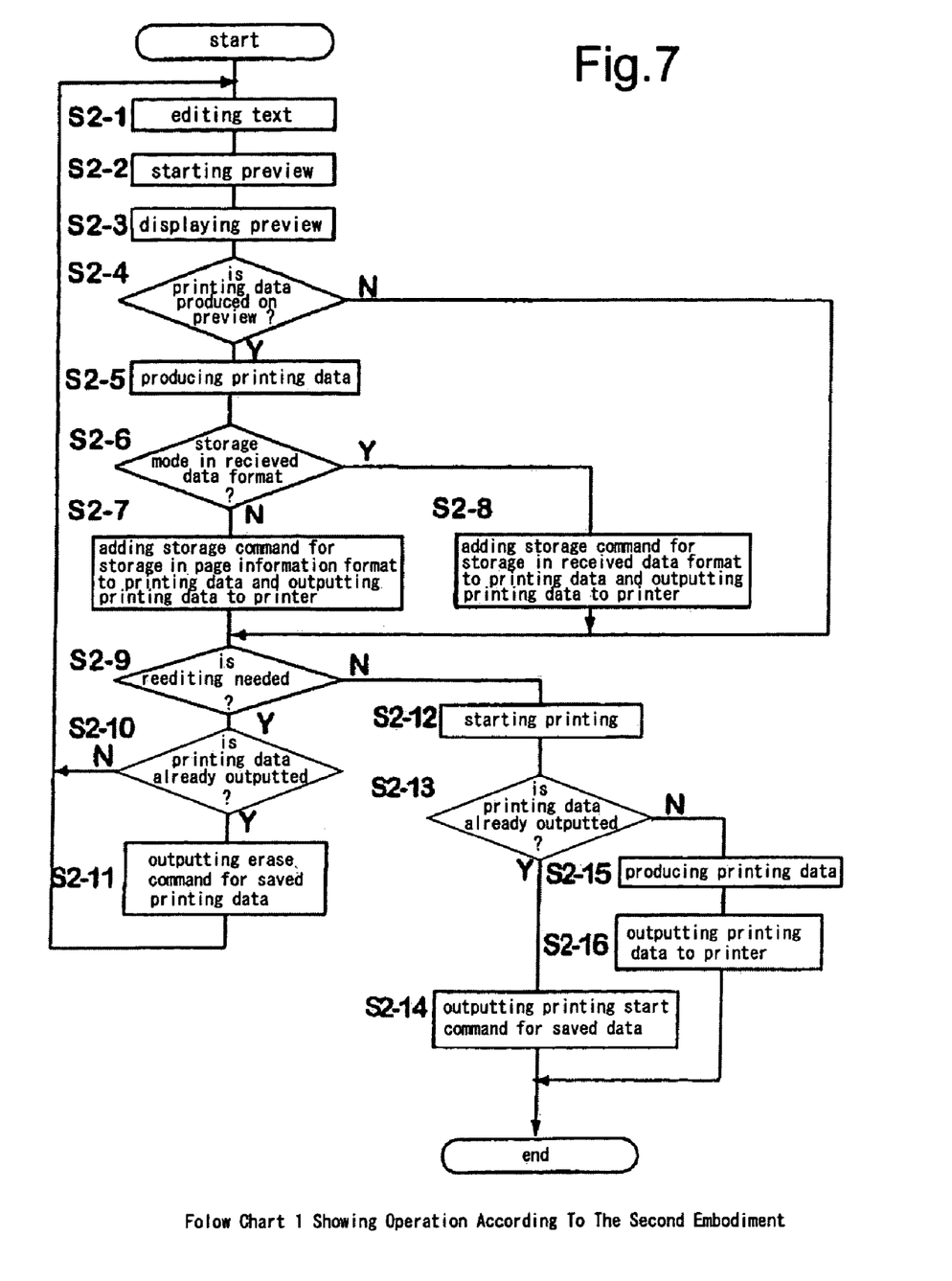
FIG. 7 is a flow chart 1 showing operation according to the second embodiment.

Operation according to the second embodiment is explained next. The operation according to the second embodiment is explained with dividing the operation of the image processing apparatus 11 (in FIG. 5) from the operation of the image forming apparatus 12 (in FIG. 5). The operation of the image processing apparatus 11 (in FIG. 5) is first explained. FIG. 7 is a flow chart vol. 1 showing the operation according to the second embodiment. The operation of the image processing apparatus 11 (in FIG. 5) is explained in the order of the steps from the step S2-1 to the step S2-16.

The operator starts the application 1-2 (in FIG. 5) to edit (create) the text using the user interface section 1-1 (in FIG. 5) at the step S2-1. The operator starts the preview to confirm that the text editing conducted by the operator becomes one with his expected layout at the step S2-2. At the step S2-3, the text created by the operator is indicated on the display, not shown, arranged in the image processing apparatus 11 (in FIG. 5) prior to printing.

At the step S24, the printing data generator 11-3 (in FIG. 5) makes a judgment as to whether the white circle, the printing start period only 1-3a-1 or the black circle, the printing start and the preview periods 1-3a-2 is selected as the timing for producing the printing data, and if the white circle, the printing start period only 1-3a-1, is selected, the operation goes to the step S2-9 whereas if the black circle, the printing start period and the preview period 1-3a-2, is selected, the operation goes to the step S2-5. The printing data generator 11-3 (in FIG. 5) starts generating the printing data at the step S2-5. This step corresponds to the image data production procedure [1] in parallel with the preview.

At the step S2-6, the printing data generator 11-3 (in FIG. 5) makes a judgment as to whether the white circle, the data format as received 11-3a-1 or the black circle, the page information format after analysis of the received data 11-3a-2 is selected as the storage state of the printing data, and if the white circle, the data format as received 11-3a-1, is selected, the operation goes to the step S2-8 whereas if the black circle, the page information format after analysis of the received data 11-3a-2, is selected, the operation goes to the step S2-7.

At the step S2-7, the printing data generator 11-3 (in FIG. 5) transmits the generated printing data to the image forming apparatus 12 (in FIG. 5) after adding the printing standby command and the storage command for the storage in the page information format. This job is transmitted to and stored in the page information storage buffer 12-1 (in FIG. 5), thereby being on standby until reception of the subsequent printing start command (operation of the image forming apparatus described below).

At the step S2-8, the printing data generator 11-3 (in FIG. 5) transmits the generated printing data to the image forming apparatus 12 (in FIG. 5) after adding the printing standby command and the storage command in the received data format. This job made of the printing data is transmitted to and stored in the received data storage buffer 2-7 (in FIG. 5), thereby being on standby until reception of the subsequent printing start command (operation of the image forming apparatus described below).

The step 2-7 and the step 2-8 correspond to the addition and output procedure [12] for the printing standby command. It is to be noted that the printing data added with the printing standby command and the standby type command are directly transmitted independently of a subsequent flow from this step to the image forming apparatus 12 (in FIG. 5) through the communicator 1-4 (in FIG. 5), the line 3 (in FIG. 5), and the communicator 2-1 (in FIG. 5) (shown by a dotted line in the figure).

At the step S2-9, where the operator finds some defect in the text with the preview and recognizes the need of the reedition after this finding, the operation goes to the step S2-10. If the operator finds no defect or does not recognizes the need of the reedition after finding small defects in the text, the operation goes to the step S2-12. At the step S2-10, if the printing data are not yet transmitted to the image forming apparatus 12 (in FIG. 5), the operation returns to the step S2-1 to require the operator to redo form the text editing. If the printing data are already transmitted to the image forming apparatus 12 (in FIG. 5), the operation goes to the step S2-11.

After the printing data generator 11-3 (in FIG. 5) transmits the job including the erase command to the image forming apparatus 12 (in FIG. 5) to cancel the printing data, which is transmitted to the image forming apparatus 12 (in FIG. 5), is stored in the received data storage buffer 2-7 (in FIG. 5) or in the page information storage buffer 12-2 (in FIG. 5), and is waiting for reception of a subsequent command, the operation then returns to the step S2-1 to require the operator to redo the text reediting. It is to be noted that the job including the erase command is directly transmitted independently of a subsequent flow from this step to the image forming apparatus 12 (in FIG. 5) through the communicator 1-4 (in FIG. 5), the line 3 (in FIG. 5), and the communicator 2-1 (in FIG. 5)(shown by the dotted line in the figure). The step S2-9 (a Y portion), the step S2-10, the step S2-11 as described above correspond the reediting request procedure [3].

The application 1-2 (in FIG. 5) initiates the printing at the step S2-12. At the step S2-13, the operation of the printing data generator 11-3 (in FIG. 5) goes to the step S2-14 in a case where the printing data are already transmitted to the image forming apparatus 12 (in FIG. 5) and stored in the received data storage buffer 2-7 (in FIG. 5) or in the page information storage buffer 12-1 (in FIG. 5) and are waiting for reception of a subsequent command whereas going to the step S2-15 in a case where the printing data are not yet transmitted to the image forming apparatus 12 (in FIG. 5).

The printing data generator 11-3 (in FIG. 5) outputs the printing start command for directing the printing execution to the image forming apparatus 12 (in FIG. 5) at the step S2-14. The job made of the printing start command is transmitted to the image forming apparatus 12 (in FIG. 5) through the communicator 1-4 (in FIG. 5), the line 3 (in FIG. 5), and the communicator 2-1 (in FIG. 5). The printing data generator 11-3 (in FIG. 5) generates the printing data for an unprocessed portion of the text at the step S2-15.

The job made of the printing data is transmitted to the image forming apparatus 12 (in FIG. 5) through the communicator 1-4 (in FIG. 5), the line 3 (in FIG. 5), and the communicator 2-1 (in FIG. 5) to execute printing at the step S2-16. Herein, the step S2-15 and the step S2-16 correspond to situations where the white circle, the printing start period only 1-3a-1, is selected in the above described property 1-3a (in FIG. 2), i.e., corresponding to the conventional procedure not included in the premise of the operational explanation. The step S2-9 (an N portion), the step S2-12, the step S2-13 (a Y portion), and the step S2-14 described the above correspond to the printing start requirement procedure [4].

Figure 8:
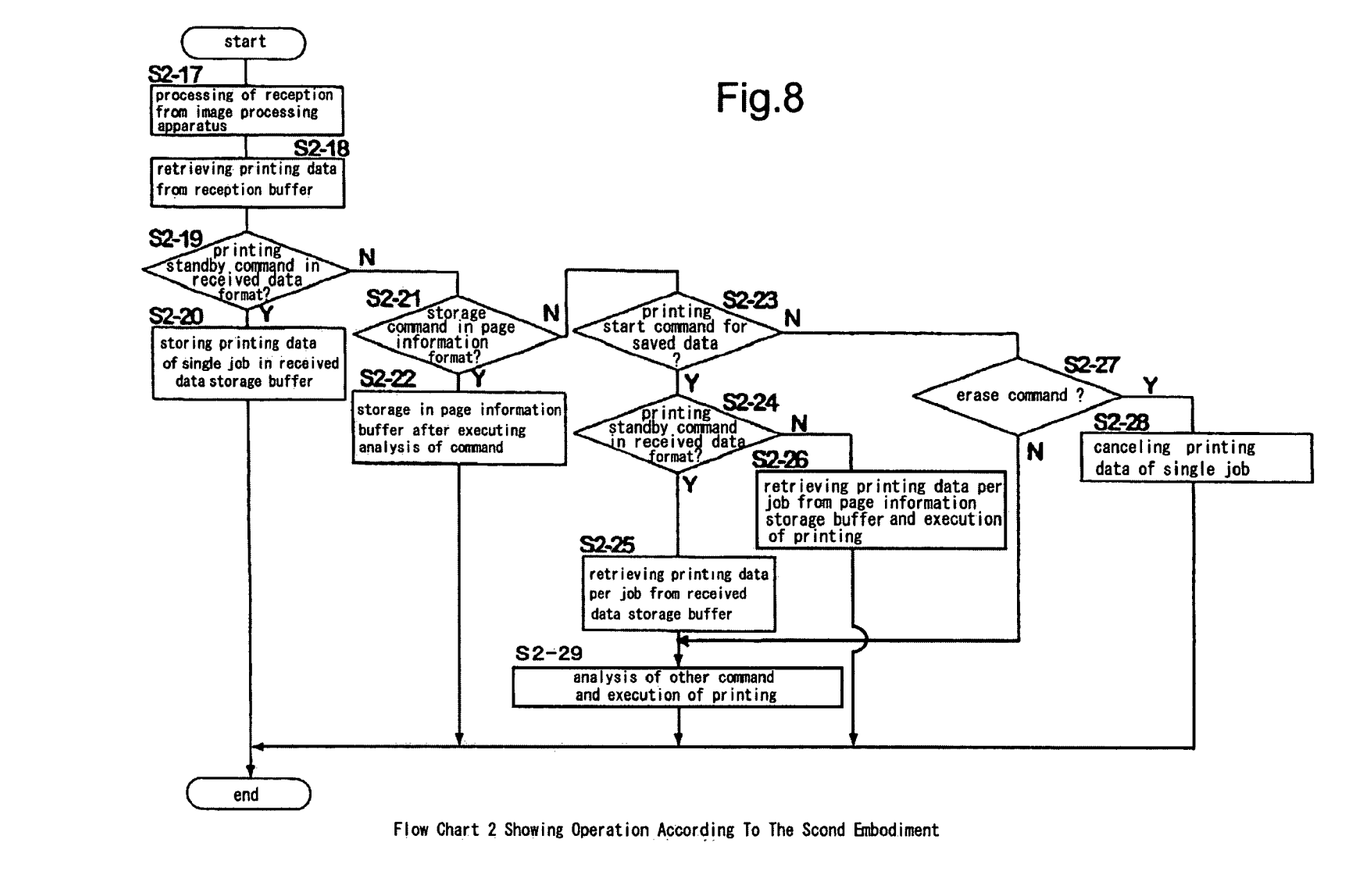
FIG. 8 is a flow chart 2 showing operation according to the second embodiment.

FIG. 8 is a flow chart vol. 2 showing the operation according to the second embodiment. The operation of the image processing apparatus 12 (in FIG. 5) is explained in the order of the steps from the step S2-17 to the step S2-28.

At the step S2-17, the communicator 2-1 (in FIG. 5) receives the job including such as various commands and printing data from the printing processing apparatus 11 (in FIG. 5) through the communicator 1-4 (in FIG. 5) and the line 3 (in FIG. 5), thereby holding temporarily the job in the reception buffer 2-2 (in FIG. 5). The editor 12-3 (in FIG. 5) retrieves the job received from the image processing apparatus 11 (in FIG. 5) and held temporarily in the reception buffer 2-2 (in FIG. 5) at the step S2-18. At the step S2-19, the editor 12-3 (in FIG. 1) makes a judgment as to whether the retrieved job is the job made of the printing data added with the printing standby command and the storage command for the storage in the received data format, and if the job is the printing data added with the storage command for the storage in the received data format, the operation goes to the step S2-20 whereas if the job is other than that, the operation goes to the step S2-21.

At the step S2-20, the editor 12-3 (in FIG. 5) stores the printing data of the retrieved single job as they are in the received data buffer 2-7 (in FIG. 5), and the operation of the editor 12-3 returns to the step S2-18 to retrieve a subsequent job. At the step S2-21, the editor 12-3 (in FIG. 5) makes a judgment as to whether the retrieved job is a job including the printing data added with the printing standby command and the storage command in the page information format, and if the job is the printing data added with the storage command in the page information format, the operation goes to the step S2-22 whereas if the job is the printing data other than that, the operation goes to the step S2-23.

At the step S2-22, the editor 12-3 (in FIG. 5) executes the analysis of the command of the retrieved job. The editor 12-3 stores in the page information storage buffer 12-1 (in FIG. 5) the pattern of the page information format in which the analysis of the command is completed. After all of the commands of the printing data of the single job are analyzed and the job is stored in the page information storage buffer 12-1 (in FIG. 5), the operation returns to the step S2-18 to retrieve a subsequent job. The step 2-19, the step S2-20, the step S2-21 (Y), and the step S2-22 described above correspond to the printing data storage procedure [15].

At the step S2-23, the editor 12-3 (in FIG. 5) makes a judgment as to whether the retrieved job is the printing start command, and if the job is the printing start command, the operation goes to the step S2-24 whereas if the job is not the printing start command, the operation goes to the step S2-27. At the step S2-24, the editor 12-3 (in FIG. 5) makes a judgment as to whether the printing start command directs a storage mode in the received data format, and if the printing start command directs the storage mode in the received data format, the operation goes to the step S2-25 whereas if the printing start command does not direct the storage mode in the received data format, the operation goes to the step S2-26.

At the step S2-25, the editor 12-3 (in FIG. 5) retrieves the printing data of the single job from the received data storage buffer 2-7 (in FIG. 5), and the operation goes to the step S2-29 described hereinafter for the printing execution. At the step S2-26, the editor 12-3 (in FIG. 5) retrieves the data in the page information type stored in the page information storage buffer 12-1 (in FIG. 5), and the operation goes to the step S2-29 for the printing execution. The step S2-23 (Y), the step S2-24, the step S2-25, the step S2-26, and the step S2-29 described above correspond to the printing execution procedure [17].

At the step S2-27, the editor 12-3 (in FIG. 5) makes a judgment as to whether the job is the erase command, and if the job is the erase command, the operation goes to the step S2-28 whereas if the job is not the erase command, the operation goes to the step S2-29. This case corresponds to a case where the white circle, the printing start period only 1-3a-1, is selected in the property 1-3a (in FIG. 2), or namely, corresponds to a conventional control procedure not included in the premise of explanation for operation.

At the step S2-28, the editor 12-3 (in FIG. 5) cancels the printing data of the single job stored in the received data storage buffer 2-7 (in FIG. 5) or in the page information storage buffer 12-1 (in FIG. 5), and the operation returns to the step S2-17. The step S2-27 (Y) and the step S2-28 correspond to the printing data canceling procedure [16]. Other command procedures are made to the printing data retrieved or received at the step S2-25 or the S2-26, and the above printing data are transmitted to the development section 2-5 (in FIG. 5) and the engine section 2-11 (in FIG. 5) to execute printing.

Each of the image data production procedure [1] in parallel with the preview, the addition and output procedure [2] for the printing standby command, the reedit requirement procedure [3], the printing start requirement procedure [4], the printing data storage procedure [15], the printing data canceling procedure [16], and the printing execution procedure [17] is a control procedure based on the computer program stored in a computer readable recording media, but a part or the whole of those above procedures may consist of one or more specialized hardware capable of executing each procedure.

As described the above, the method according to the invention has the property for selecting the storage format of the printing data to enable the operator to select the storage format of the printing data in the image forming apparatus, so that the time for the development process of the printing data can be shortened, and so that an effect can be obtained in which the time between the text creation and the printing execution can be further shortened.

Although the above description explains an application in which this invention applies to the printer, this invention is applicable to a facsimile machine as well as a complex machine having a host interface and the process for analyzing the command equal to those of the printer.

What is claimed is:

1. A method of printing data input to an image processing apparatus, said image processing apparatus converting the input data to printing data, and transmitting the printing data to an image forming apparatus for printing, the method comprising the steps of:
    starting display of a preview image of the input data on a display unit included with the image processing apparatus;
    starting to generate the printing data at substantially the same time as starting to display the preview image;
    starting to transmit the printing data to the image forming apparatus while displaying the preview image; and adding a printing standby command to the printing data prior to transmitting the printing data to the image forming apparatus, wherein the printing data is caused to be stored in a storage buffer in the image forming apparatus.

2. The method of claim 1, further including the step of transmitting a print start command to the image forming apparatus wherein, upon receipt of the print start command in the image forming apparatus, the printing data stored in the storage buffer is printed.

3. The method of claim 1, further including the step of transmitting an erase command to the image forming apparatus wherein, upon receipt of the erase command in the image forming apparatus, the printing data presently stored in the storage buffer is thereafter prevented from being printed.

4. The method of claim 1, further including the step of adding a page information storage command to the printing data prior to transmitting the printing data to the image forming apparatus, wherein the printing data is caused to be transmitted to the image forming apparatus in page format and stored in a storage buffer in the image forming apparatus in page format.

5. The method of claim 4, further including the step of transmitting a print start command to the image forming apparatus wherein, upon receipt of the print start command in the image forming apparatus, the printing data stored in the storage buffer is printed.

6. The method of claim 4, further including the step of transmitting an erase command to the image forming apparatus wherein, upon receipt of the erase command in the image forming apparatus, the printing data presently stored in the storage buffer is thereafter prevented from being printed.

7. A method of printing data input to an image processing apparatus, said image processing apparatus converting the input data to printing data, and transmitting the printing data to an image forming apparatus for printing, the method comprising the steps of:
    starting display of a preview image of the input data on a display unit included with the image processing apparatus;
    starting to generate the printing data at substantially the same time as starting to display the preview image; and
    starting to transmit the printing data to the image forming apparatus while displaying the preview image, wherein if the input data needs to be edited after the printing data has been generated and transmitted to the image forming apparatus, an erase command is transmitted to the image forming apparatus wherein, upon receipt of the erase command in the image forming apparatus, the printing data presently stored in a storage buffer in the image forming apparatus is thereafter prevented from being printed.

8. A computer program embodied in a computer readable media for printing input data, the input data having been input to an image processing apparatus, said image processing apparatus converting the input data to printing data, and transmitting the printing data to an image forming apparatus for printing, the program comprising the steps of:
    starting display of a preview image of the input data on a display unit included with the image processing apparatus;
    starting to generate the printing data at substantially the same time as starting to display the preview image;
    starting to transmit the printing data to the image forming apparatus while displaying the preview image, and adding a printing standby command to the printing data prior to transmitting the printing data to the image forming apparatus, wherein the printing data is caused to be stored in a storage buffer in the image forming apparatus.

9. The program of claim 8, further including the step of transmitting a print start command to the image forming apparatus wherein, upon receipt of the print start command in the image forming apparatus, the printing data stored in the storage buffer is printed.

10. The program of claim 8, further including the step of transmitting an erase command to the image forming apparatus wherein, upon receipt of the erase command in the image forming apparatus, the printing data presently stored in the storage buffer is thereafter prevented from being printed.

11. The program of claim 8, further including the step of adding a page information storage command to the printing data prior to transmitting the printing data to the image forming apparatus, wherein the printing data is caused to be transmitted to the image forming apparatus in page format and stored in a storage buffer in the image forming apparatus in page format.

12. The program of claim 11, further including the step of transmitting a print start command to the image forming apparatus wherein, upon receipt of the print start command in the image forming apparatus, the printing data stored in the storage buffer is printed.

13. The program of claim 11, further including the step of transmitting an erase command to the image forming apparatus wherein, upon receipt of the erase command in the image forming apparatus, the printing data presently stored in the storage buffer is thereafter prevented from being printed.

14. A method of printing data input to an image processing apparatus, said image processing apparatus converting the input data to printing data, and transmitting the printing data to an image forming apparatus for printing, the method comprising the steps of:
- starting display of a preview image of the input data on a display unit included with the image processing apparatus;
- starting to generate the printing data at substantially the same time as starting to display the preview image; and
- starting to transmit the printing data to the image forming apparatus while displaying the preview image, wherein if the input data needs to be edited after the printing data has been generated and transmitted to the image forming apparatus, an erase command is transmitted to the image forming apparatus wherein, upon receipt of the erase command in the image forming apparatus, the printing data presently stored in a storage buffer in the image forming apparatus is thereafter prevented from being printed.

15. A system for printing input data comprising an image processing apparatus and an image forming apparatus, the input data being input to the image processing apparatus, said image processing apparatus converting the text input to printing data and transmitting the printing data to the image forming apparatus for printing, the system comprising:
- a display unit included with the image processing apparatus which starts to display a preview image of input data;
- a printing data generator included in the image processing apparatus which starts to generate the printing data at substantially the same time as the display of the preview image is started; and
- a communicator included in the image processing apparatus which starts to transmit the printing data to the image forming apparatus while the display displays the preview image, wherein a printing standby command is added to the printing data prior to transmitting the printing data to the image forming apparatus, wherein the printing data is caused to be stored in a storage buffer in the image forming apparatus.

16. The system of claim 15, wherein a print start command is transmitted by the image processing apparatus to the image forming apparatus wherein, upon receipt of the print start command in the image forming apparatus, the printing data stored in the storage buffer is printed.

17. The system of claim 15, wherein an erase command is transmitted by the image processing apparatus to the image forming apparatus wherein, upon receipt of the erase command in the image forming apparatus, the printing data presently stored in the storage buffer is thereafter prevented from being printed.

18. The system of claim 15, wherein a storage command is added to the printing data prior to transmitting the printing data to the image forming apparatus, wherein the printing data is caused to be transmitted to the image forming apparatus in page format and stored in a storage buffer in the image forming apparatus in page format.

19. The system of claim 18, wherein a print start command is transmitted by the image processing apparatus to the image forming apparatus wherein, upon receipt of the print start command in the image forming apparatus, the printing data stored in the storage buffer is printed.

20. The system of claim 18, wherein an erase command is transmitted by the image processing apparatus to the image forming apparatus wherein, upon receipt of the erase command in the image forming apparatus, the printing data presently stored in the storage buffer is thereafter prevented from being printed.

21. A system for printing input data comprising an image processing apparatus and an image forming apparatus, the input data being input to the image processing apparatus, said image processing apparatus converting the text input to printing data and transmitting the printing data to the image forming apparatus for printing, the system comprising:
- a display unit included with the image processing apparatus which starts to display a preview image of input data;
- a printing data generator included in the image processing apparatus which starts to generate the printing data at substantially the same time as the display of the preview image is started; and
- a communicator included in the image processing apparatus which starts to transmit the printing data to the image forming apparatus while the display displays the preview image, wherein if the input data needs to be edited after the printing data has been generated and transmitted to the image forming apparatus, an erase command is transmitted to the image forming apparatus wherein, upon receipt of the erase command in the image forming apparatus, the printing data presently stored in a storage buffer in the image forming apparatus is thereafter prevented from being printed.

* * * * *

UNITED STATES PATENT AND TRADEMARK OFFICE
CERTIFICATE OF CORRECTION

PATENT NO. : 7,609,394 B2 Page 1 of 1
APPLICATION NO. : 10/987097
DATED : October 27, 2009
INVENTOR(S) : Tetsuya Hosoi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1354 days.

Signed and Sealed this

Twelfth Day of October, 2010

David J. Kappos
*Director of the United States Patent and Trademark Office*